United States Patent [19]

van der Lely

[11] 4,202,160
[45] May 13, 1980

[54] CROP WORKING MACHINE

[76] Inventor: Cornelis van der Lely, 7, Brüschenrain, Zug, Switzerland

[21] Appl. No.: 810,614

[22] Filed: Jun. 27, 1977

[30] Foreign Application Priority Data

Jun. 29, 1976 [NL] Netherlands .................... 7607093

[51] Int. Cl.³ ............................................. A61D 76/00
[52] U.S. Cl. ....................................................... 56/366
[58] Field of Search ................. 56/370, 365, 366, 16.4

[56] References Cited

U.S. PATENT DOCUMENTS

| | | | |
|---|---|---|---|
| 3,611,690 | 10/1971 | Zweegers | 56/366 |
| 3,827,224 | 8/1974 | Mulder et al. | 56/370 |
| 3,841,073 | 10/1974 | van der Lely | 56/370 |
| 3,946,544 | 3/1976 | van der Lely | 56/370 |
| 3,971,203 | 7/1976 | van der Lely | 56/370 |
| 3,992,863 | 11/1976 | van der Lely | 56/370 |
| 4,023,335 | 5/1977 | van der Lely et al. | 56/370 |

FOREIGN PATENT DOCUMENTS

| | | | |
|---|---|---|---|
| 234424 | 6/1962 | Austria | 56/377 |
| 1136948 | 12/1968 | United Kingdom | 56/344 |

*Primary Examiner*—Russell R. Kinsey
*Attorney, Agent, or Firm*—Mason, Mason and Albright

[57] ABSTRACT

A rake machine has two rake wheels that are driven to rotate about upwardly extending axes. Each member has a rim and groups of tines are pivoted to the rim. The tines can be pivoted from lower, crop working positions to raised, inoperative positions. A respective tine engaging device on a holder can be set to intersect the tines during rotation thereof and displace same upwardly against spring bias. A latch engages each of the inoperatively positioned tine groups until centrifugal force overcomes the resistance and the tines pivot outwardly and downwardly into operative positions. The devices of the rake wheels are linked to a lever which can displace the devices to protective positions for the tines. The rake wheels are displaceably mounted along the length of a transverse beam and the beam is linked to a coupling trestle by a parallelogram linkage that can be set to reposition the rake members. The parallelogram linkage is connectable in an offset position with respect to the center of the trestle and a driving connection is supported by a bearing located to one side of the parallelogram linkage.

36 Claims, 6 Drawing Figures

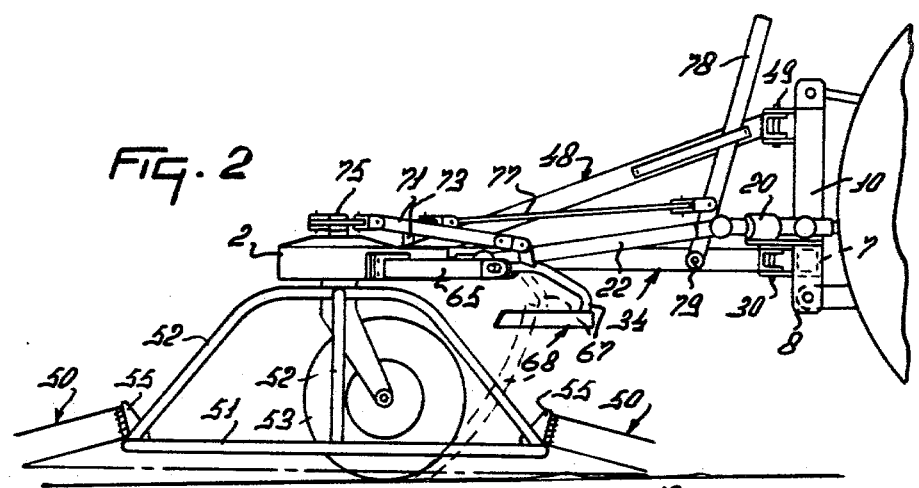

CROP WORKING MACHINE

SUMMARY OF THE INVENTION

According to a first aspect of the present invention there is provided a crop working machine comprising at least one rake member provided with a tine which is movable from an operative position into an inoperative position, there being provided a device which is movable into a tine engagement position in which said tine is engaged by the device during rotation of the rake member thereby to cause the tine to move into the inoperative position.

According to a second aspect of the present invention there is provided a crop working machine comprising at least one rake member provided with a tine and a device affording a protective member for the rake member, at least part of the protective member being movable into the path described by the tine in operation of the machine.

According to a third aspect of the present invention there is provided a crop working machine comprising at least one rake member which is laterally displaceable relatively to the intended direction of travel by means of a parallelogram linkage in which the length of one of the members of the linkage is variable.

According to a fourth aspect of the present invention there is provided a crop working machine comprising at least one rake member which is fastened to a trestle by means of a parallelogram linkage the machine being hitchable to a three-point lift of a tractor by means of the trestle, one member of the linkage being secured at a central location on the trestle.

According to a fifth aspect of the present invention there is provided a crop working machine comprising at least one rake member having a drive input shaft, and a driving shaft for driving the input shaft from the power take-off of a tractor, the machine comprising a bearing for supporting the driving shaft, the bearing being disposed, in use, between the connection between the machine and the tractor and the input shaft.

For a better understanding of the invention and to show how the same may be carried into effect, reference will now be made by way of example to the accompanying drawings, in which:

BRIEF DESCRIPTION OF THE DRAWINGS

FIG. 2 is a horizontal side elevation of the machine in the direction of the arrow II in FIG. 1;

FIG. 3 is an elevational view of the trestle for connecting the machine to the lifting device of a tractor as seen in the direction of the arrow III in FIG. 1;

FIG. 4 is an enlarged plan view of part of the machine of FIGS. 1 to 3;

DESCRIPTION OF THE PREFERRED EMBODIMENT

Figure 1:
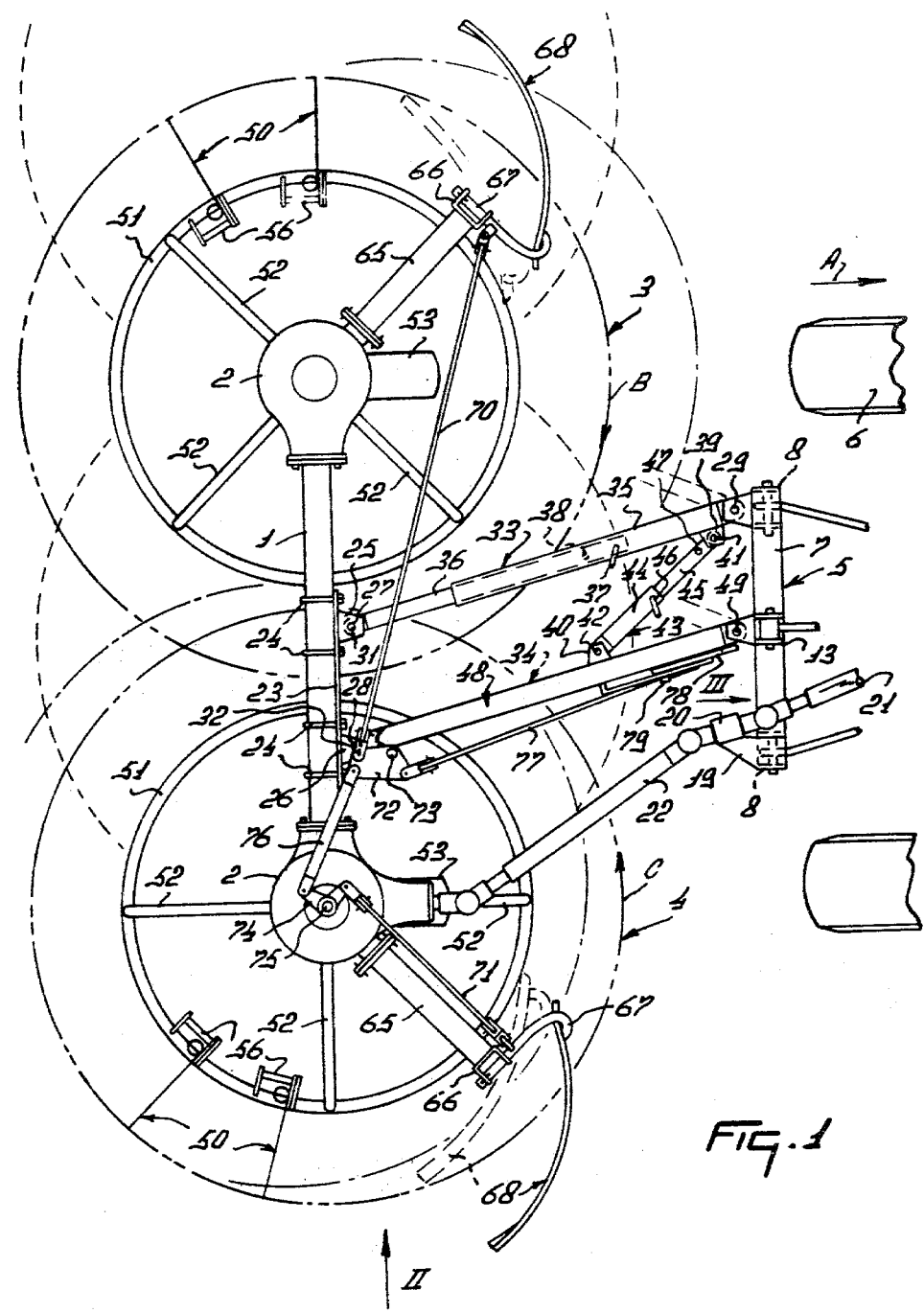
FIG. 1 is a plan view of one embodiment of a crop working machine.

The Figures show an embodiment of a rotary haymaking machine comprising a frame beam 1, which extends, in most working positions of the machine, perpendicular to the intended direction of movement A and which is provided at its ends with gear boxes 2, in which upwardly inclined rotary shafts of two rake members 3 and 4 are journalled. The rake members 3 and 4 can be mechanically driven in mutually opposite directions B and C respectively so that the crop displaced by the rake members 3 and 4 is conveyed inwardly and to the rear between the two rake members. The machine can be connected to a lifting device of a tractor 6 by a trestle 5 connected to the machine. In the embodiment shown the machine is connected to a three-point lift at the rear of the tractor 6, but it is also possible to construct the machine so that the trestle 5 can be fastened to a three-point lift where the same is provided at the front of a tractor, in which case, of course, the directions of rotation B and C are reversed.

The trestle 5 has a generally symmetrical construction as is shown in FIG. 3. The trestle 5 comprises a horizontal hollow beam 7, which, in use, is arranged symmetrically to the vertical longitudinal plane of symmetry of the tractor 6. The beam 7 is provided at its ends and on the lower side with lugs 8 having holes 9 for receiving a locking pin in order to fasten the two ends of the beam 7 to the lower lifting arms as links of the lifting device of the tractor 6. At the center of the beam 7 is rigidly secured an upright 10, which extends upwardly away from the beam 7 and is at right angles thereto. Near its top end the upright 10 is provided with tags 11 spaced one above the other and extending at right angles to the upright, these tags having aligned holes 12. The top end of the upright 10 is furthermore provided with tags 13 extending parallel to the upright 10 and having aligned holes 14, the common center line of which is horizontal and extends transversely of the direction of movement A. The common center line of the holes 12 in the tags 11 extends vertically and is located approximately in the vertical longitudinal plane of symmetry of the tractor 6. One end of the beam 7 in this embodiment, the left-hand end, viewed in the direction of movement A, is provided, apart from the downwardly projecting lugs 8, with vertically spaced horizontally disposed ears 15 that extend rearwardly therefrom. The ears 15 have aligned holes 16, the common center line of which extends vertically. The centre of the beam 7 is provided with further rearwardly extending ears 17, which are horizontal spaced one above the other. The ears 17 have holes 18, with a coinciding center line which extends vertically and is located approximately in the longitudinal vertical plane of symmetry of the tractor 6 and also in the vertical plane of symmetry of the upright in the direction of movement A. On the top side of the end of the beam 7 remote from the ears 8 and 15 there is a holder 19, which is inclined away from its fastening point on the beam 7 and which holds at its rear end a bearing 20 located above the top surface of the beam 7 for supporting and coupling an auxiliary shaft 21. The shaft 21 is coupled with the power take-off shaft of the tractor and is located at the front of the bearing 20. The bearing 20 also holds a driving shaft 22 which transmits drive for the rake members 3 and 4 from the bearing 20 to the input shaft of the right-hand gear box 2. The two shafts 21 and 22 have universal couplings and are telescopic, the two adjacent ends of the shafts being intercoupled in the bearing 20.

The trestle 5 can be coupled with the top arm of the three-point lifting device of the tractor 6 by means of the tags 13.

A fastening plate 23 is clamped against the front portion of the frame beam 1 by a plurality of U-shaped clamping brackets 24. The fastening plate 23 has welded to it two pairs of relatively spaced ears 25 and 26, which extend forwardly therefrom, each pair having two aligned holes 27 and 28, with a coinciding center line which is approximately vertical in operation. The distance between the coinciding centre lines of the holes in the pairs of ears 15 and 17 is equal to the distance between the center lines of the pairs of holes 27 and 28. The holes in the pair of ears 15 hold a pivotal pin 29 and the holes of the pair of ears 17 receive a pivotal pin 30. Pivotal pins 31 and 32 are inserted into the holes 27 and 28. A rod 33 is connected to the pivotal pins 29 and 31 and a rod 34 is connected to the pivotal pins 30 and 32. The rods 33 and 34 are provided at each end with fork pieces mounted on the corresponding pivotal pins. The rod 33 is telescopic and comprises two rod portions 35 and 36, a portion of the rod portion 36 being received inside the rod portion 35. The rod portions 35 and 36 are relatively axially secured by a locking pin 37, which extends through aligned holes provided in the two rod portions. The rod portion 36 has at least further hole 38 so that the portions 35 and 36 can be fixed in at least one other relative disposition, in which the overall length of the rod 33 is smaller than in the position shown. The rod 34 has a fixed length.

Near the front end of the rod 33 the rod portion 35 has a pair of tags 39 extending laterally toward the rod 34, while approximately midway along its length the rod 34 is provided with a pair of tags 40, which extend laterally toward the rod 33. The pairs of tags 39 and 40 hold pivotal pins 41 and 42, to which are pivoted a diagonal rod 43. The rod 43 is also telescopic and comprises rod portions 44 and 45, which can be relatively fixed in two positions by means of a locking pin 46, one position being shown in FIG. 1 and the other position being determined by a second hole 47 in the rod portion 35, which can also co-operate with the locking pin 46.

In the position shown in FIG. 1 the center line of the pivotal pins 29 to 32 form the corners of a parallelogram, which is held in the configuration shown by the diagonal rod 43. By the co-operation of the locking pin 46 with the set of holes 47 in the rod portion 45 the parallelogram structure is turned into a position partially indicated by broken lines, in which the frame beam 1 is still at right angles to the direction of movement A, while the rake members are offset relatively to the longitudinal plane of symmetry of the tractor. This lateral displacement of the frame beam 1 with respect to the trestle 5 may, if desired, be enhanced by loosening the clamping brackets 24, and by sliding the plate 23 along the frame beam 1, thereafter refastening the clamping brackets. A further possibility of adjustment lies in that the locking pin 37 may be inserted into the holes 38 of the rod portion 36, which results in a position in which the frame beam 1 is at an acute angle to the direction of movement A. This position may be employed for spreading crop from an edge of a field obliquely to the direction of movement A so that crop is prevented from passing across the borders of the field (see the position indicated by dot-and-dash lines).

The rear end of the rod 34 is fastened to the ears 26 by means of a fork piece held by the pivotal pin 32. To the same fork piece is fastened an upwardly inclined pull rod 48 extending away therefrom to the front, the foremost end of which is also fastened by means of a fork piece to a pivotal pin 49, which extends through the holes 12 of the tags 11. The common center line of the holes 12 coincides with the holes in the ears 17. The pull rod 48 constitutes together with the rod 34 and the upright 10 a vertical rigid triangle structure, which is pivotable with respect to the frame beam 1 and whose two rods 34 and 48 are pivotable about the pivotal pins 30 and 49 with respect to the trestle 5 and are fixable in a plurality of positions.

Each of the rake members 3 and 4 is provided with twelve tines 50, which are fastened to a rim 51, supported on the hub of the respective rake member by spokes 52 which extend upwardly and inwardly from said rim. Each of the rake members 3 and 4 is supported by a ground wheel 53 which is located beneath the foremost half of the rake member concerned and is fixable, in a manner not shown, about an upright pivotal shaft with respect to the frame beam 1.

The two tines of each group extend in operation outwardly and nearly in a plane at right angles to the rotary axis of the rake member concerned, but extending slightly downwards, in the direction away from the rim 51. Viewed parallel to the rotary axis of the rake member, the tines 50 extend approximately radially when the machine is employed as a tedder. However, if the machine is employed for building swaths and crop guiding members are arranged behind the two rake members, the tines extend rearwardly with respect to the directions of rotation B and C. Each tine of a group has, near its fastening point, coils 54 (FIGS. 4, 5), and a connecting piece between the two coils is fastened to an angle plate 55. The tines of each group 50 are made from a single length of steel wire. The plate 55 is rigidly secured to a pivotal shaft 56, having a center line which extends approximately tangentially to the rotary axis of the rake member concerned, to which it is perpendicular, or nearly perpendicular. The pivotal shaft 56 is located inside the rim 51. The pivotal shaft 56 is surrounded by a helical torsional spring 57, one end of which is fastened to the plate 55, and the other end of which is secured to a strip 58. The strip 58 is freely pivotable about the pivotal shaft 56 and has a portion 59 extending transversely of the center line of the pivotal shaft 56, which it surrounds, and a portion 60 which is bent at a distance from the pivotal shaft 56 with respect to the portion 59 in a direction away from the plate 55 (FIGS. 4 and 6). The free end of the portion 60 of the strip 58 has a notch 61 (FIG. 6) which is triangular in this embodiment. The parts of the free end next to the notch 61 merge through rounded portions into the edges of the portion 60 extending parallel to the pivotal shaft 56. The free end of the portion 60 bears on a latch plate 62, which is welded to the rim 51 and which extends inwardly and upwardly away from this rim. The pivotal shaft 56, extends through a hole in the latch plate 62. At this hole, viewed parallel to the rotary axis of the rake member concerned, the latch plate 62 has a V-shaped kink 63 and the free end of the latch plate 62 is in line with the strip 58 substantially parallel to shaft 56. The proportioning is such that the portion 60 of the strip 58 engages the latch plate 62 in the tine position shown in FIG. 4 at the area of the transition of the limb of the V-shaped kink 63 on the side of the rim 51 to the straight portion of the latch plate 62 located near the rim 51, whereas the portion 69 of the strip 58 is not in contact with the latch plate 62. In the tine position (non-operative or transport position) shown by broken lines in FIG. 5, in which the tines extend upwardly and in which the strip 58 is also turned upwardly, the notch 61 of the strip 58 fits around the part of the V-shaped kink, where the two sides of the kink meet. At the end remote from the latch plate 62 the pivotal shaft is supported by a plate 64, which is secured to the rim 51 and which extends away from this rim inwardly and upwardly.

Figure 5:
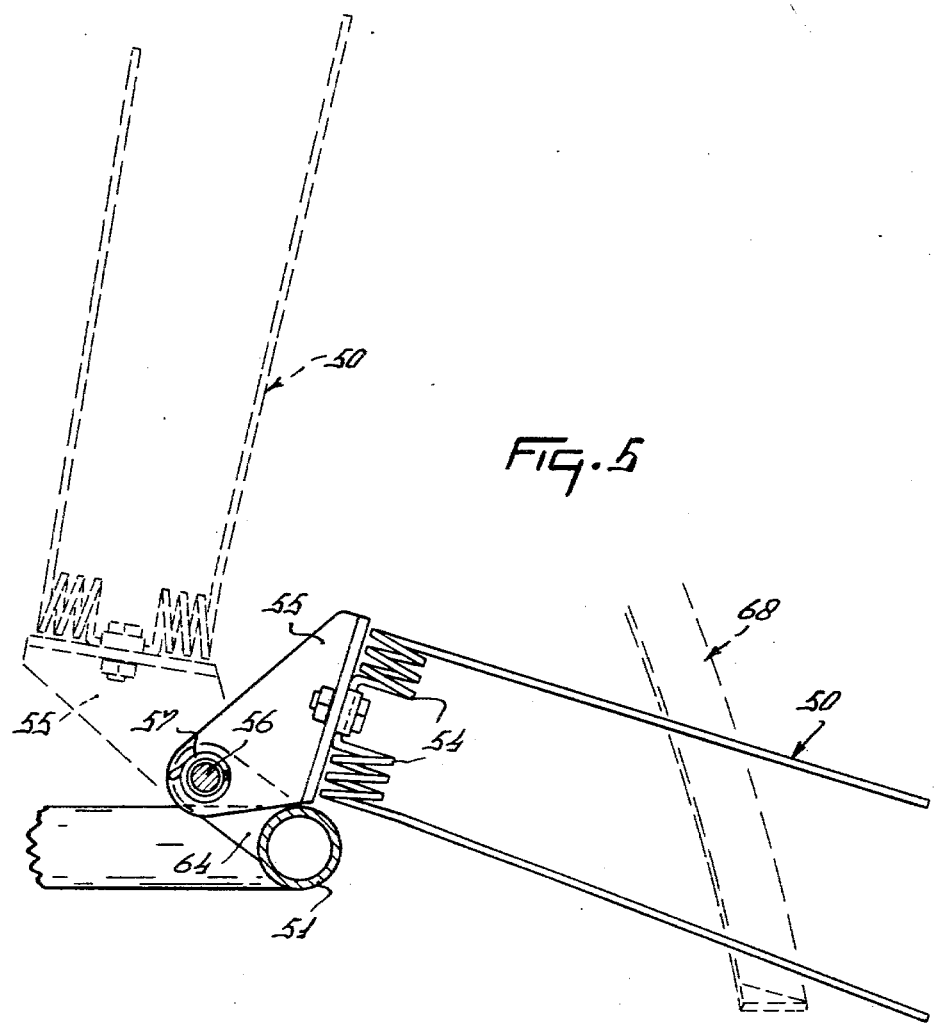
FIG. 5 is an elevational view, partly in section, taken on the line V—V in FIG. 4.
Figure 6:
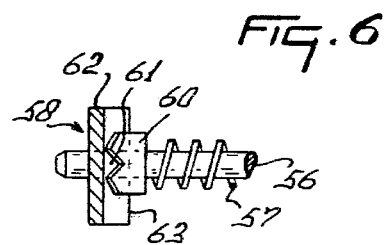
FIG. 6 is an elevational view, partly in section, taken on the line VI—VI in FIG. 4.

In the position indicated by broken lines in FIG. 5, in which the tines extend upwardly and which corresponds with a non-operative or transport position, the center of gravity of each assembly, comprising a group of tines 50 and the strips 55 and 58, is located, viewed in a tangential direction or on plan, between the pivotal shaft 56 and the rotary axis of the rake member and at a higher level than the pivotal shaft 56. In the working position indicated by solid lines in FIG. 5 this center of gravity is still above the pivotal shaft 56.

To the two gear boxes 2 are secured tubular supports 65, which are both inclined forwardly and outwardly from the respective gear box 2; in operation they are substantially horizontal. The length of the supports 65 is such that, viewed in a direction parallel to the rotary axis of the rake member concerned, the outer end is located slightly outside the rim 51 concerned. In the embodiment illustrated the supports 65 are at an angle of about 45° to the direction of movement A. The outer end of each support 65 is provided with a fork piece 66, in which a holder 67 is pivotably mounted. The holder is substantially horizontal in operation and is generally perpendicular to the rotary axis of the rake member concerned and to the respective support 65. Each holder 67 is inclined forwardly and inwardly away from its fork piece 66 and is bent near the front outwardly and then rearwardly, the rearwardly bent end being substantially parallel to that part of the holder 67 which is held in the fork piece 66. The end remote from the fork piece 66 holds an elongate strip-like device 68 which extends in the position indicated by solid lines in FIGS. 1 and 2 and viewed on plan, from the holder 67 outwardly so as to trail, in a spiral-like manner, with respect to the directions of rotation B and C. Viewed on plan, the free end of the device 68 is located outside the path described by the outer ends of the groups of tines. The end of the device 68 located near the holder 67 is located, viewed on plan, substantially midway between the rims 51 and the tine path. In the elevational view of FIG. 2 the device 68 has, in this position, a substantially rectangular circumference and extends horizontally to the rear away from the holder 67. The device 68 extends, in the direction of rotation of the rake member, over a comparatively short distance beyond the holder 67 and has a free end at this place. The device 68 is fixed on the inner side of the gate-shaped holder 67.

In a second position indicated by broken lines the device 68 extends, viewed on plan (FIG. 1) from the holder 67 also in a spiral-like manner outwardly against the direction of rotation, but it is directed less outwardly with the result that the free end of the device 68 is located between the rim 51 and the path described by the ends of the tines. The hindmost free end of the device 68 is located, in this second position indicated by broken lines, beneath the plane of revolution described by the under-side of the lower tine of each group (FIG. 2). The curvature of the device 68 is such that in this second position the operative surface of the device facing the lower tine crosses the plane of revolution described by the under-side of the lower tines. The devices 68 may be slightly elastic, but the degree of resilience of these devices must be selected in dependence upon the nature of the fastening mode of the tines.

To each holder 67 is rigidly secured a lever 69, to the other end of which is pivotally connected an actuating rod 70 (left-hand rake member) or 71 (right-hand rake member). The end of the rod 70 remote from its holder 67 is pivotally connected to a coupling plate 72, which can turn, in operation, about a substantially vertical pivotal shaft 73 with respect to the machine frame. The pivotal shaft 73 is pivotally journalled near the hindmost end of the pull rod 48. The end of the actuating rod 71 remote from its holder 67 is pivoted to a bellcrank lever 74, which is freely pivotable about a pivotal shaft 75, the center line of which coincides with the rotary axis of the rake member 4. The other end of the lever 74 is pivotally connected to a push-rod 76, the other end of which is pivotally connected to the coupling plate 72 at a point located near the pivotal connection of the actuating rod 70 with the coupling plate. The buckling resistance of the rod 76 exceeds that of the rods 70 and 71, since compressive forces are applied to the rod 76, whereas the rods 70 and 71, in practice, are only subjected to tensile forces. The rod 70 at both ends and rod 71 at its inboard end are fastened by universal joints to the associated structural parts. At its outboard end rod 71 is pivotably connected to holder 67.

To the coupling plate 72, on the side remote from the fastening points of the rods 70 and 76, is coupled a rod 77 by means of a universal joint. The rod 77 extends to the front from the coupling plate 72 and, viewed on plan, is almost parallel to the tubular rods 34 and 48. The front end of the rod 77 is coupled by a universal joint with a lever 78, which is located directly behind the trestle 5. This hinge connection of the rod 77 with the lever 78 is located at a distance above the lower point of the lever 78, which is adapted to turn about a substantially horizontal pivotal shaft 79 which is perpendicular to the tubular rod 34. The top end of the lever 78 projects above the trestle 5 and can be actuated from the tractor seat. The tractor driver can put the lever 78 into either of two positions in each of which the lever is biased either forward or to the rear with respect to the rod 48. These lever positions correspond with the positions indicated by solid lines and broken lines respectively of the device 68.

The machine operates as follows. As stated above, the frame beam 1 and the two rake members 3 and 4 can be displaced, by displacing the diagonal rod 43, parallel to themselves relatively to the tractor into a position in which the machine projects laterally from the tractor, the parallelogram linkage between the frame beam 1 and the trestle 5 being maintained. Also, or alternatively, the rod 33 may be shortened so that the frame beam 1 is set at an acute angle to the direction of movement A, in which case crop can be tedded inwardly away from the boundaries of fields. In the vertical direction, a rigid suspension of the machine is obtained by using the triangular structure including the tubular rods 34 and 48 in conjunction with the upright 10, the rod 48 being then loaded by tensile force. By using the bearing 20 on one side of the trestle 5 and by an asymmetric disposition of the parallelogram structure 1, 33, 7, 34 on the other side of the trestle 5 an advantageous transmission of drive is obtained through the auxiliary shaft 21 and the driving shaft 22 for the input shaft of the driving gear of the rake members, while the starting point is invariably a fixed point with respect to the machine, i.e. the bearing 20 without the driving shaft 22 being interfered with by the fastening structure between the frame beam 1 and the trestle 5. Since the pivotal shaft 73 is located near the pivotal shaft 32 the effect of displacement of the parallelogram linkage on the position of the devices 68 is slight.

The torsional springs 57 (FIGS. 4 to 6) are stressed to urge the free ends of the respective groups of tines downwards, in operation, the rim 51 then affording a limiting stop for the group of tines. In this working position of the machine the reactive force of each torsional spring 57 is exerted on the strip 58, and tends to turn the portion 60 of that strip in an upward direction. This force is resisted by the engagement of the free end of the portion 60 on the adjacent side of the V-shaped kink 63. The torsional spring 57 is comparatively weak so that the portion 60 will not slide along the side of the kink 63, in which case the strip 58 would slide in an axial direction along the pivotal shaft 56. Since the center of gravity of the assembly of the group of tines 50 and of the strips 55 and 58, in the working position, is located above the pivotal shaft 56, the group of tines is urged downwards by centrifugal force until the angle plate 55 or the coils 54 engage the rim 51. If the lowermost tine encounters unevennesses of the ground, the group of tines, after rising, is still pressed downwards by centrifugal force, and the torsional spring 57 accelerates the return of the tines 50 to their working position so that the tines are raised above the ground surface for the shortest possible time. If the return to the working position were slow, crop could be left behind. When the group of tines 50 is turned upwardly into an inoperative or transport position in a manner to be described more fully hereinafter, the portion 60 of the strip 59 is turned upwards along the adjacent side of the kink 63, the strip 58 being thus compelled to slide axially along the pivotal shaft 56 so as to compress the spring 57. This movement of the strip 58 lags with respect to the upward movement of the group of tines 50 owing to the presence of the spring 57 but this movement of the tines can be continued until the strip 58 has turned to an extend such that the triangular notch in the free end of the portion 60 snaps around the junction of the two sides of the V-shaped kink 63, over which it is held by spring force. Thus the group of tines occupies a position in which the tines will not return to their working position during transport. When subsequently the rake members 3 and 4 are again rotated, the group of tines will automatically turn into the working position by centrifugal force since the center of gravity of the assembly is located above the pivotal shaft 56. The triangular notch 61 will be forced over the junction of the two sides of the kink 63. Such unlocking is possible since the spring 57 is comparatively weak. Since in the transport position, viewed on plan, the center of gravity of the pivotable time assembly is located between the pivotal shaft 56 and the rotary axis of the associated rake member, the group of tines is held in this inoperative position by its own weight.

In the positions indicated by solid lines of the devices 68, in which these devices extend horizontally above the plane of revolution of the tines and in which the lever 78 is in the foremost position, the devices 68 projecting beyond the tine path, viewed on plan, serve as protective guards to prevent accidental contact with the rotating rake members. When the lever 78 is put in its rearward position, the coupling plate 72 is turned about the pivotal shaft 73 to move the rods 70 and 71 outwardly, the holders 67 and the respective devices 68 being then turned downwards into the position indicated by broken lines in FIGS. 1 and 2. This takes place at the end of a working period of the machine, when the drive of the rake members 3 and 4 has been put off and the rake members rotate with a gradually decreasing speed, preferably a short time before the rake members actually stop. In the position of the devices 68 indicated by broken lines in FIGS. 1 and 2 these devices 68 intercept the groups of tines passing by during rotation of the rake members, the lower tine of each group sliding along the top side of the device 68, so that the tine concerned is compelled to turn about the associated pivotal shaft 56 and to ascend along the device 68 until the inoperative or transport position of the group of tines is reached, in which position the notch 61 snaps around the kink 63. At this instant the free end of each tine in the group has turned upwardly to an extent such that it can escape along the front side of the associated device 68 through the gate formed by the curved front end of the holder 67. In the meantime the lower tine of the next-following group is guided upwards by the device 68 and is moved in the same manner into the transport position. This is continued until all groups of tines are in the transport position. In this transport position the device 68 slightly projects beyond the overall width of the two rake members in the transport position. Tilting up of the tines may alternatively be effected by stopping the rake members, by turning downwards the devices 68 and then by slowly turning the rake members through one revolution. Before putting the machine again into operation, the lever 78 is moved forwards so that the devices 68 turn into the position indicated by solid lines, thus serving as protective brackets, and as stated above, the tines will automatically turn into the working postion by centrifugal force. The devices 68, having a double function, ensure in a simple manner that the groups of tines, into the working position by spring force, are moved upwardly in a simple manner into a transport position without the need for manually turning the groups of tines one by one.

The application of the principle of the invention is not limited to the machine in the embodiment shown comprising two rake members rotating in opposite directions; it may also be applied to hay-making machines comprising two or more rake members rotating in the same directions, such machines operating, for example, as side delivery rakes, and also to machines having only one rake member, equipped with guide members for depositing the crop in a swath. In general, the principle of the invention is applicable to any machine with rake members having pivotable groups of tines.

While various features of the crop working machine described, and illustrated in the drawings, will be set forth in the following claims as inventive features, it is to be understood that the invention is not necessarily limited to these features but encompasses all inventive features is disclosed both individually and in various combinations.

What I claim is:

1. A crop working machine comprising a frame and at least one rake member being rotatable about an upwardly extending axis and supported on said frame, driving means connected to rotate said rake member, said rake member including circular rim means and tine means mounted on said rim means whereby said tine means is pivotable from a lower crop engaging position to a raised inoperative position, a tine engaging device being mounted on said frame adjacent the path described by said tine means during rotation, said device being positionable to engage said tine means in the latter's operative position during rotation thereof and said tine means being guided by said device to an inoperative raised position.

2. A machine as claimed in claim 1, wherein said rake member has a plurality of spaced apart tines which are pivotable sequentially into respective inoperative positions by engagement with said device.

3. A machine as claimed in claim 2, wherein said device comprises an elongate strip portion that engages said tines.

4. A machine as claimed in claim 3, wherein a holder is mounted from said frame and said device is fastened to project from said holder.

5. A machine as claimed in claim 4, wherein said device is displaceable from a first position wherein it engages said tine means to a second position in which it projects relative to said holder in a substantially horizontal direction generally opposite to the normal direction of rotation of said rake member.

6. A machine as claimed in claim 4, wherein said device extends radially outwardly from said holder in a spiral-like manner when viewed in a direction parallel to the rotary axis of said rake member.

7. A machine as claimed in claim 6, wherein said device extends downwardly from the holder in a tine engagement position.

8. A machine as claimed in claim 7, wherein said holder is connected adjacent a forward end of said device with respect to the direction of rotation of the rake member.

9. A machine as claimed in claim 8, wherein said holder has a curved part adjacent a connection to the device, said part being curved through an angle of at least 90°.

10. A machine as claimed in claim 9, wherein said device has free ends positioned between the path described by outer ends of the tines and the fastening points of the tines, to said rake member.

11. A machine as claied in claim 10, wherein a front end of said device is located at a shorter distance from the path described by the fastening points of the tines to said rake member than a rear end of the device.

12. A machine as claimed in claim 11, wherein the rear end of said device is located below said path of said tines in their operative positions.

13. A machine as claimed in claim 10, wherein a tine engaging portion of said device is positioned in the plane described by the lowermost portions of said tines.

14. A machine as claimed in claim 1, wherein said device is pivotably connected to said frame and displaceable into at least two positions, said device being tiltable upwardly from a lower tine engaging position about a pivot, said pivot being spaced from and generally perpendicular to the rotary axis of said rake member, said device in its tilted-up position being positioned outwardly from said tines and affording a protective member for said tines.

15. A crop working machine comprising a frame and at least one rake member being rotatable about an upwardly extending axis and supported on said frame, driving means connected to rotate the rake member, said rake member including a circular perimeter member and a plurality of tines pivoted on said perimeter member, whereby said tines are adjacent to and are spaced around said perimeter member, a tine engaging device being connected to said frame and said device comprising an elongated portion that is positionable at least partly outboard of and adjacent to said perimeter member, said elongated portion being selectively positionable sequentially to engage said tines during the rotation of said rake member.

16. A machine as claimed in claim 15, wherein said device is selectively pivotable to a tilted-up substantially horizontal position outside the paths of said tines to protect said tines.

17. A machine as claimed in claim 16, wherein said device is selectively pivotable to a tine engaging position inclined downwardly and extending outwardly in a direction generally opposite to the normal direction of rotation of said rake member.

18. A machine as claimed in claim 16, wherein the outermost end of said device is located outside and above the paths described by said tines.

19. A machine as claimed in claim 15, wherein a tubular holder is mounted on said frame, said device being fastened to said tubular holder at a place spaced radially from the rotary axis of said rake member, said holder extending in the direction of forward movement of the machine and outwardly relative to the rotary axis of said rake member, said device being linked to said frame through a lever included in said device and linkage means mounted on said frame connected to tilt said device.

20. A crop working machine comprising a frame including a beam and spaced apart rake members being mounted along said beam, said beam extending transverse to the direction of travel, a forward coupling member comprising a trestle, lingage comprising a pair of generally parallel rod means which are pivoted at their rear aspects to said beam between said rake members and at their forward aspects to said trestle, driving means connected to rotate the rake members whereby said rake members are rotatable about substantially vertical axes, the length of at least one said rod means being selectively variable and said rake members being selectively displaceable by changing the length of said one rod means relative to said trestle, said trestle being connectable to a lifting device of a tractor.

21. A machine as claimed in claim 20, wherein said linkage can be rearranged in position by means of a setting rod which is provided between said rod means and connected thereto.

22. A machine as claimed in claim 20, wherein a bearing mounted on said trestle supports a driving shaft for said rake members and said bearing is located between a power take-off shaft of a tractor to which the machine is attachable and a driving shaft for the rake members.

23. A crop working machine comprising a frame and spaced apart rake members being mounted along the length of a beam of said frame, said beam extending transverse to the direction of travel and being pivoted to a forward coupling comprising a three-point trestle by linkage, said linkage having links comprising generally parallel rod means pivoted to said beam between said rake members, driving means connected to rotated said rake members whereby said rake members are rotatable about substantially vertical axes, the front ends of said rod means being connected to said three-point trestle and said trestle being connectable to a three-point lifting device of a tractor, one of said rod means being pivoted to a central point of said trestle, said trestle adapted to be mounted on the lifting device of a tractor and said driving means having a driving shaft engageable with a power take-off of the tractor through a bearing and said bearing being located to one side of said linkage and secured to said trestle.

24. A crop working machine which comprises a frame and a rake wheel mounted thereon adapted to rotate about an axis, said rake wheel including tine connection means and at least one tine disposed at a distance from said axis on said tine connection means, means on said frame for moving said tine from an operative to an inoperative position, pivot means in said tine connection means including a pivot axis about which said tine is movable, said tine connection means being provided with locking means which locks said tine automatically in an inoperative position when said tine is moved from said operative position to said inoperative position about said pivot axis, said locking means including a first locking member rigidly connected to said rake wheel and a second locking member connected to said tine by resilient means which is urged against said first locking member with continuously increasing force as said tine is moved from said operative position to said inoperative position, and tine further adapted to move about said pivot axis automatically into its operative position as a result of centrifugal forces acting thereon sufficient for such purpose due to rotation of said rake wheel.

25. A machine as claimed in claim 24, wherein said tine is displaceable by encountering a movable device mounted on said frame to an inoperative position and means locking said tine in that position.

26. A machine as claimed in claim 25, wherein said resilient means comprises a compression spring around said pivot axis.

27. A machine as claimed in claim 24, wherein the center of gravity of each said tine in its inoperative position is located between a respective pivotal axis and the rotary axis of the rake member, when viewed in plan.

28. A machine as claimed in claim 27, wherein said tine is unlocked and pivoted downwardly into a working position by centrifugal force during rotation.

29. A machine as claimed in claim 24, wherein said tine extends outwardly in its working position.

30. A machine as claimed in claim 24, wherein said tine connection means comprises an assembly and a spring structure holds the assembly in operative position.

31. A crop working machine which comprises a rake wheel adapted to rotate about an axis, said rake wheel including a rake frame and at least one tine connected to said frame at a distance from said axis, pivot means mounted on said frame including a pivot axis about which said tine is movable from an operative crop working position into an inoperative position and reverse, said tine connection being provided with restraining means which includes resilient means and which restrains said tine automatically in said inoperative position about said pivot axis and rigid means against which said resilient means is continually urged with increasing force as said tine moves from said operative position to said inoperative position, said restraining means comprising means by which said resilient means is stressed in an axial direction with respect to said pivot axis during movement into said inoperative position so as to restrain said tine in its inoperative position.

32. A crop working machine in accordance with claim 31, wherein said resilient means comprises a compression spring which is disposed to surround said pivot axis.

33. A crop working machine in accordance with claim 31, wherein said resilient means is disposed to urge said tine downwardly when said tine is in said operative position.

34. A crop working machine in accordance with claim 33, wherein said rigid means comprises a planar inclined surface and said resilient means includes a matching inclined planar surface which engages said first mentioned planar surface whereby movement of said tine in said operative position in an upward direction causes said resilient means to urge said further planar surface to slide on said first mentioned planar surface whereby said resilient means is increasingly compressed.

35. A crop working machine in accordance with claim 24, wherein said tine and said tine connection means have a center of gravity when said tine is in said inoperative position which, as seen from above, is between said pivot axis and said axis of rotation of said rake wheel.

36. A crop working machine in accordance with claim 35, wherein said center of gravity in said inoperative position is disposed above a plane which contains said pivot axis and which is perpendicular to said axis of rotation of said rake wheel.

* * * * *